(12) United States Patent
Kulkarni et al.

(10) Patent No.: US 11,466,620 B2
(45) Date of Patent: Oct. 11, 2022

(54) HYBRID MANUFACTURING OF A SUPPORT HOUSING

(71) Applicant: Siemens Energy, Inc., Orlando, FL (US)

(72) Inventors: Anand A. Kulkarni, Charlotte, NC (US); Charalambos Polyzopoulos, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 70 days.

(21) Appl. No.: 16/755,352

(22) PCT Filed: May 1, 2018

(86) PCT No.: PCT/US2018/030351
§ 371 (c)(1),
(2) Date: Apr. 10, 2020

(87) PCT Pub. No.: WO2019/078921
PCT Pub. Date: Apr. 25, 2019

(65) Prior Publication Data
US 2021/0199052 A1    Jul. 1, 2021

Related U.S. Application Data

(60) Provisional application No. 62/574,806, filed on Oct. 20, 2017, provisional application No. 62/574,799, filed on Oct. 20, 2017.

(51) Int. Cl.
*F02C 7/22* (2006.01)
(52) U.S. Cl.
CPC ............ *F02C 7/22* (2013.01); *F05D 2220/32* (2013.01); *F05D 2230/22* (2013.01); *F05D 2230/31* (2013.01)

(58) Field of Classification Search
CPC .. F23R 3/283; F23R 3/286; F23R 3/14; F02C 7/22; F02C 7/222
See application file for complete search history.

(56) References Cited

U.S. PATENT DOCUMENTS 8,205,452 B2 * 6/2012 Boardman ................ F23R 3/36
60/737
8,220,272 B2 * 7/2012 Hall .......................... F23R 3/283
60/740

(Continued)

FOREIGN PATENT DOCUMENTS

| EP | 3053674 A1 | 8/2016 |
| EP | 3076084 A1 | 10/2016 |
| WO | 2009148680 A2 | 12/2009 |

OTHER PUBLICATIONS

PCT International Search Report and Written Opinion of International Searching Authority dated Jul. 20, 2018 corresponding to PCT International Application No. PCT/US2018/030351 filed May 1, 2018.

*Primary Examiner* — Todd E Manahan
*Assistant Examiner* — Thuyhang N Nguyen

(57) ABSTRACT

A support housing for use in distributing fuel in a gas turbine engine includes a main body defining an inlet aperture, a plurality of outlet apertures, and a substantially planar mounting surface. A first fuel channel has a wall that defines a first flow space and a support member extends across the first flow space and has a long axis oriented at an oblique angle with respect to the mounting surface.

12 Claims, 6 Drawing Sheets

(56) References Cited

U.S. PATENT DOCUMENTS

| | | | |
|---|---|---|---|
| 8,333,075 B2* | 12/2012 | York | F23R 3/286 |
| | | | 60/748 |
| 9,423,135 B2* | 8/2016 | Hughes | F23R 3/10 |
| 2008/0302105 A1* | 12/2008 | Oda | F23R 3/343 |
| | | | 60/737 |
| 2009/0038312 A1* | 2/2009 | Hernandez | F23R 3/343 |
| | | | 60/748 |
| 2010/0300102 A1* | 12/2010 | Bathina | F23R 3/286 |
| | | | 60/737 |
| 2016/0236271 A1 | 8/2016 | Xu | |
| 2016/0298845 A1* | 10/2016 | Nagai | F23R 3/14 |
| 2017/0248318 A1* | 8/2017 | Kulkarni | F23R 3/14 |

* cited by examiner

View VII-VII

HYBRID MANUFACTURING OF A SUPPORT HOUSING

TECHNICAL FIELD

The present disclosure is directed, in general, to hybrid manufacturing of components and more specifically to hybrid manufacturing including additive manufacturing of a support housing.

BACKGROUND

Conventional manufacture of some components can be very difficult and costly. The support housing used to distribute fuel in a gas turbine engine is one such part. The support housing includes internal chambers and flow paths that are difficult to form using conventional manufacturing techniques (e.g., casting, forging, machining, etc.).

SUMMARY

A support housing for use in distributing fuel in a gas turbine engine includes a main body defining an inlet aperture, a plurality of outlet apertures, and a substantially planar mounting surface. A first fuel channel has a wall that defines a first flow space and a support member extends across the first flow space and has a long axis oriented at an oblique angle with respect to the mounting surface.

A method of manufacturing a support housing includes coupling a base portion of the support housing to a positioning device, forming an outer wall and an inner wall on the base portion using an additive manufacturing process, the outer wall extending in a first direction, the outer wall and the inner wall spaced a first distance from one another, the first distance being at least a critical distance. The method also includes forming a support member between the inner wall and the outer wall and forming a cover wall using the additive manufacturing process, the cover wall extending from the outer wall to the support member to the inner wall and cooperating with the outer wall, the inner wall, and the base portion to enclose a first space.

In another construction, a support housing for use in distributing fuel in a gas turbine engine includes a base portion defining an inlet aperture and a substantially planar mounting surface, a boss portion extending from the base portion and defining a plurality of outlet apertures, a first fuel channel having a first wall that defines a first flow space, and a second fuel channel having a second wall that defines a second flow space, the first flow space and the second flow space being annular spaces that are spaced apart from one another. A first plurality of support members extend across the first flow space and have a long axis oriented at an oblique angle with respect to the mounting surface and a second plurality of support members extend across the second flow space and have a long axis oriented at an oblique angle with respect to the mounting surface.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
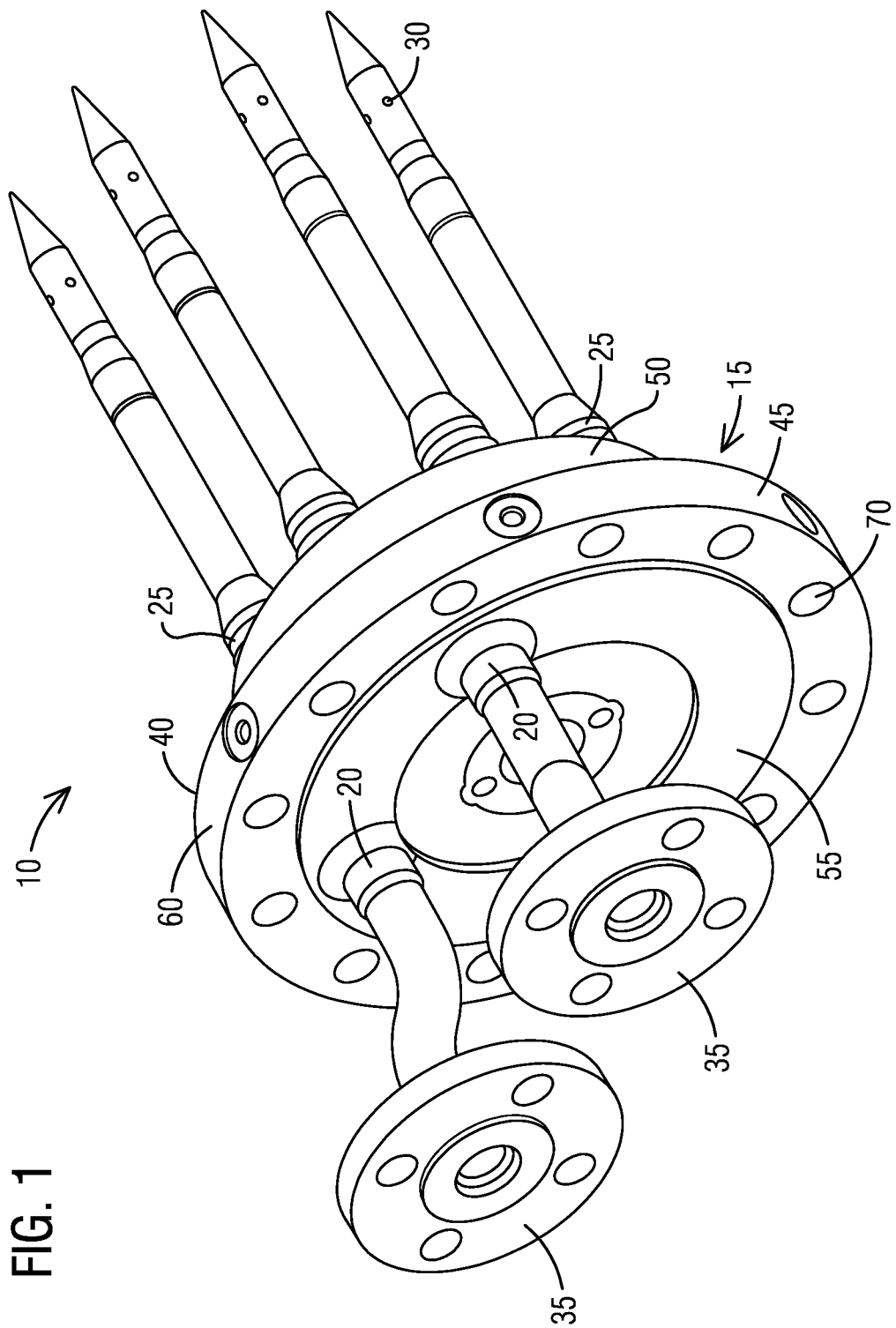
FIG. 1 is a perspective view of a support housing that operates to distribute fuel in a gas turbine engine.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

FIG. 1 illustrates a fuel assembly 10 for a gas turbine engine that includes a support housing 15, two fuel inlets 20 and several fuel outlets 25. Each fuel outlet 25 includes a nozzle 30 that distributes fuel for combustion to a different annular combustion sections. Therefore, fewer or more fuel outlets 25 may be provided to accommodate fewer or more combustion sections as may be required for the particular design or application. Two fuel inlets 20 are provided to facilitate starting the gas turbine engine and normal operation of the gas turbine engine. Only one of the fuel inlets 20 is used to distribute fuel during the start up when very little fuel is required. However, following start up, as power is increased additional fuel is required and both fuel inlets 20 are used to distribute the necessary fuel. As with the fuel outlets 25, fewer or more inlets 20 could be employed if desired.

Figure 2:
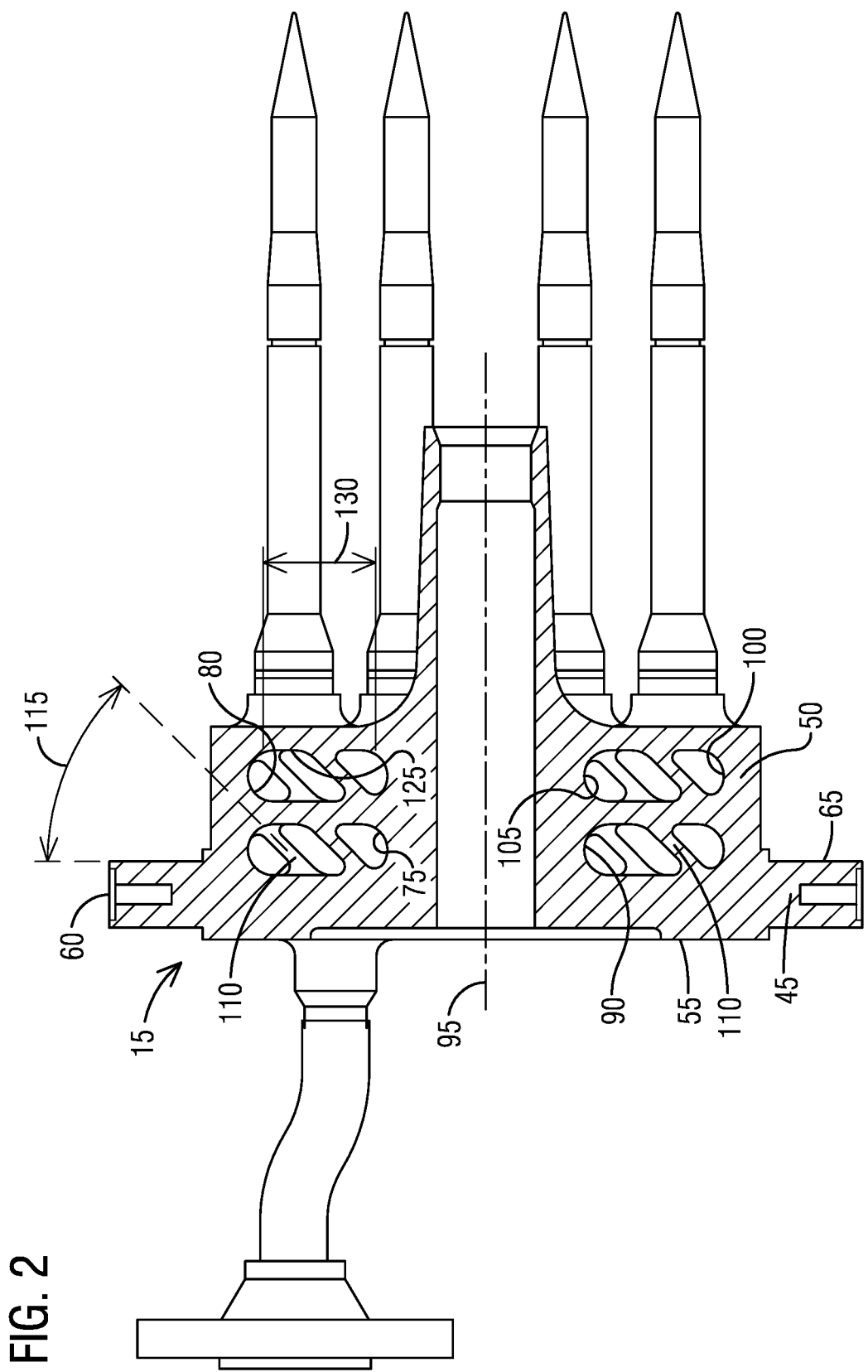
FIG. 2 is a section view of the support housing taken along line 2-2 of FIG. 1.

The support housing 15 supports the fuel outlets 25 and nozzles 30 and also supports fuel inlet pipes 35. The support housing 15, better illustrated in FIG. 2 includes a main body 40 that is made up of a base portion 45 and a boss portion 50. The base portion 45 is a cylindrically-shaped portion that defines a first end 55 of the main body 40 and the fuel inlets 20. The base portion 45 also includes a flange 60 having a mounting surface 65 and a plurality of through holes 70 that facilitate the attachment of the support housing 15 to the gas turbine engine.

The boss portion 50 extends from the base portion 45 in a direction substantially normal to the mounting surface 65 and defines a first flow space 75, a second flow space 80, and a second end 85 from which the fuel outlets 25 extend. In the illustrated construction, each of the first flow space 75 and the second flow space 80 is defined by an oval wall 90 having a long axis that is substantially parallel to the mounting surface 65. Each of the first flow space 75 and the second flow space 80 is annular and extends around a centerline 95 of the support housing 15. Each oval wall 90 includes a first or outer wall 100 and a second or inner wall 105. The inner wall 105 and outer wall 100 are spaced apart from one another a distance that is greater than a critical distance which will be discussed with regard to FIG. 3. One of the fuel inlets 20 provides fuel to the first flow space 75 and the other inlet 20 provides fuel to the second flow space 80. Each fuel outlet 25 is arranged to receive fuel from either or both of the first flow space 75 and the second flow space 80. In other constructions or arrangements, different quantities of flow spaces or differently-shaped flow spaces may be employed.

Support members 110 are positioned within each of the first flow space 75 and the second flow space 80 with each support member 110 extending across its respective flow space 75, 80. Each support member 110 defines a long axis that is arranged at an oblique angle 115 with respect to the mounting surface 65. The choice of the angle 115 will be described with regard to FIG. 3.

Figure 3:
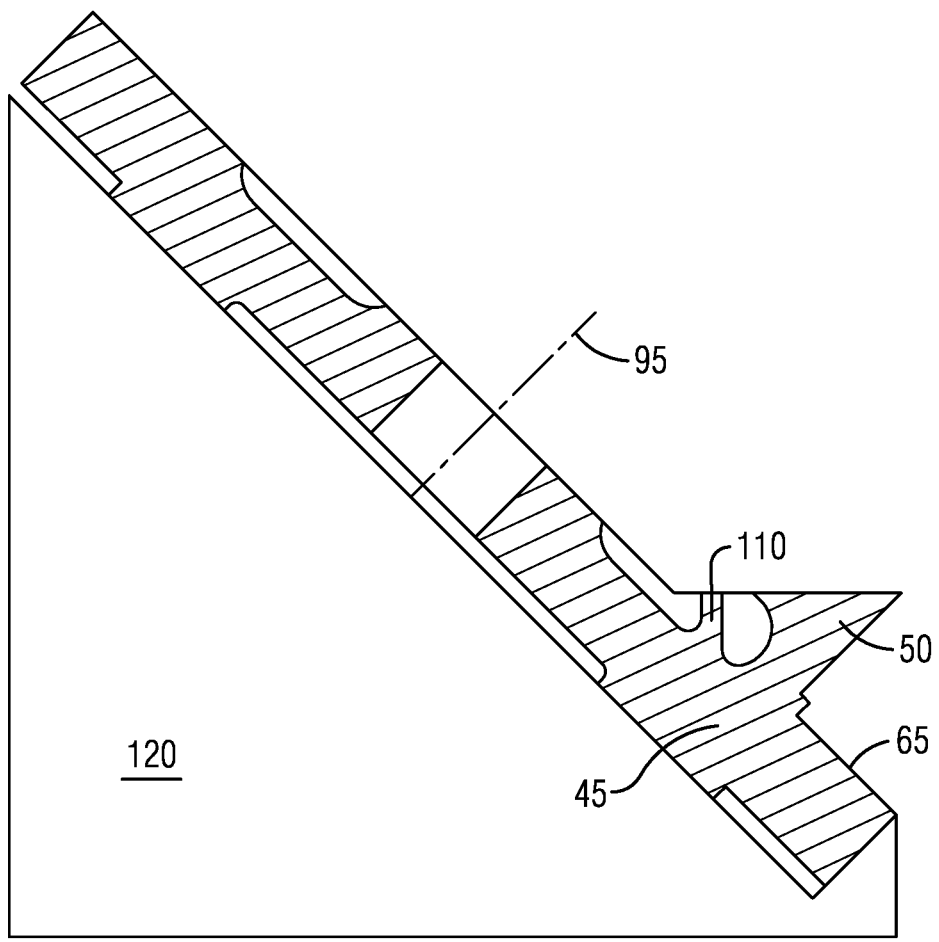
FIG. 3 is a section view of the support housing in a manufacturing position taken along line 3-3 of FIG. 1 at the start of manufacturing a boss portion.
Figure 4:
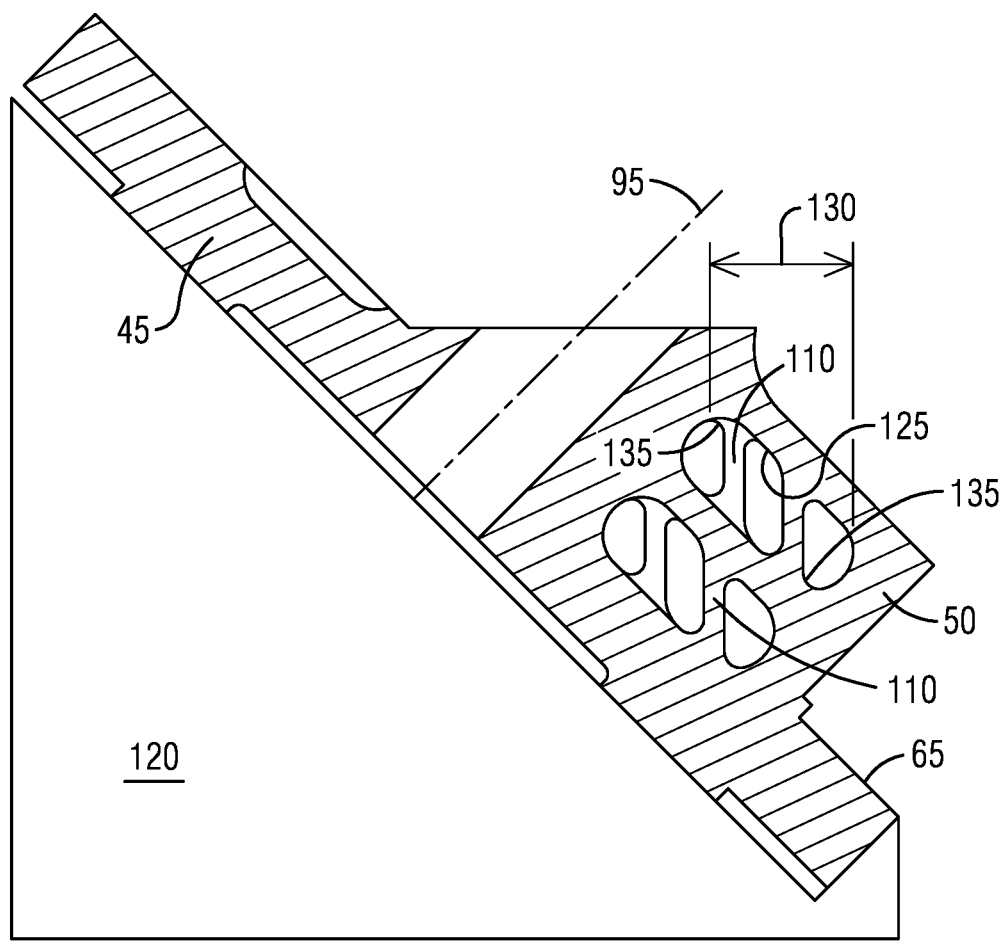
FIG. 4 is a section view of the support housing in a manufacturing position taken along line 3-3 of FIG. 1 when the boss portion is about 50 percent complete.
Figure 5:
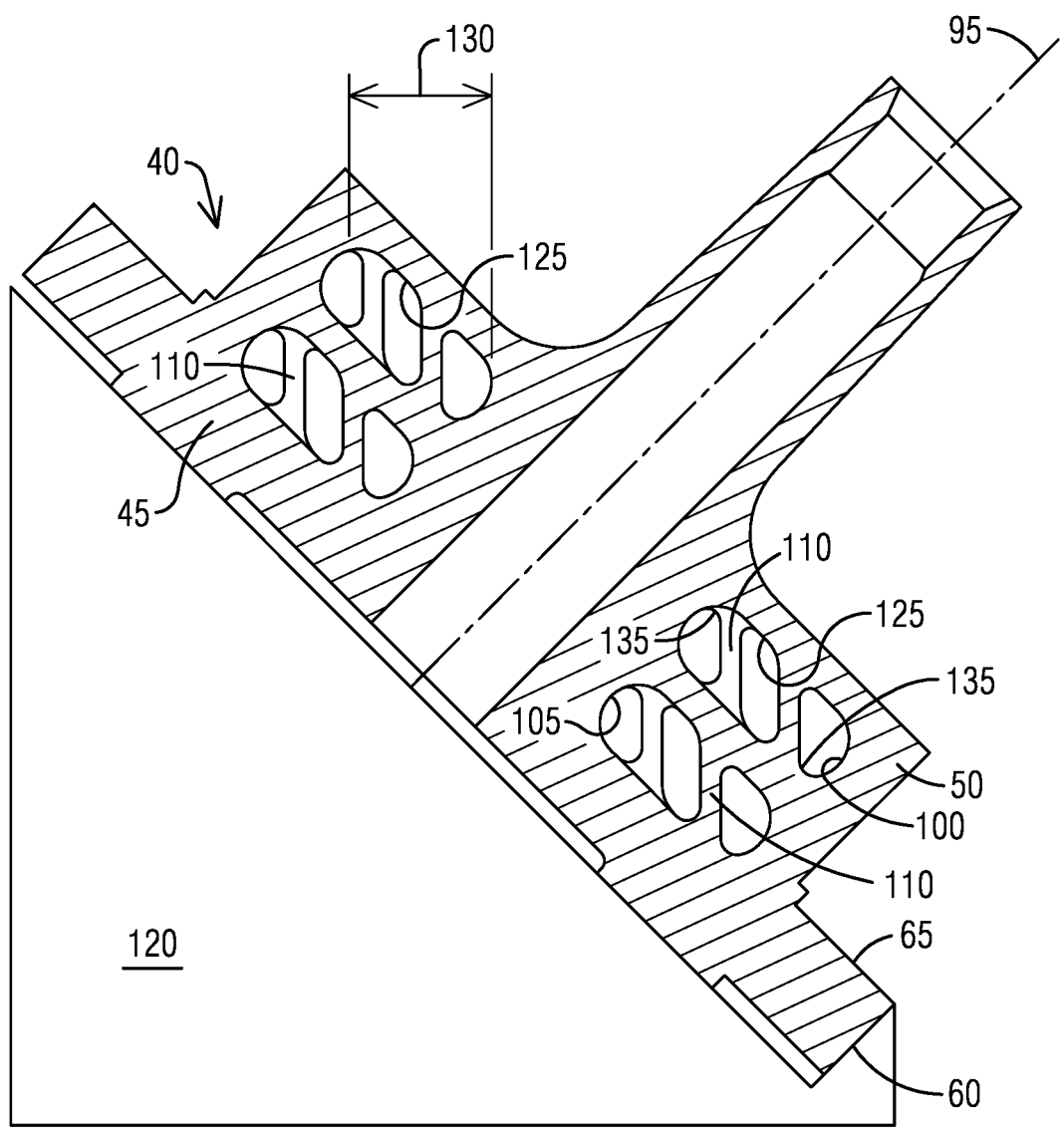
FIG. 5 is a section view of the support housing in a manufacturing position taken along line 3-3 of FIG. 1 when the boss portion is complete.

Turning to FIGS. 3-5, one possible sequence of construction for the support housing 15 is illustrated. To construct the support housing 15 the base portion 45 is connected to a positioner 120 that may allow rotation of the base portion 45 about its centerline 95 as well as rotation of the centerline 95 with respect to a vertical. The base portion 45 can be manufactured using conventional techniques including machining it from a plate material, casting, forging or the like. The boss portion 50 is then added to the base portion 45 using an additive manufacturing process.

The boss portion 50 is well-suited to manufacture using an additive manufacturing process such as direct metal laser sintering (DMLS) or selective laser sintering (SLS). Of course, other processes such as laser metal deposition (LIVID) or Electron beam melting (EBM) could be employed. The invention should not be limited by the specific process employed and could use any number of suitable processes and suitable energy sources including lasers, electron beams, plasma systems and the like.

For each of these processes, as well as other suitable processes, the boss portion 50 is built-up in a layer-by-layer fashion. The additive manufacturing processes may allow for the use of materials that might otherwise be difficult to use in forming the boss portion 50.

With continued reference to FIGS. 3-5, the positioner 120 is rotated to position the central axis 95 of the support housing 15 at about a forty-five degree angle with respect to the vertical axis. Other angles between zero degrees and about sixty degrees are possible as well, with still other angles being suitable for different support housings.

FIG. 3 illustrates the support housing 15 just after beginning the process of adding the boss portion 50. As can be seen, a portion of the outer wall 100 of the first flow space 75 is completed and part of a first support member 115a and a second support member 115b are completed. FIG. 4 illustrates the support housing 15 with the boss portion 50 about fifty percent complete. Finally, FIG. 5 illustrates the complete boss portion 50.

During an additive manufacturing process such as those employed to manufacture the support housing 15, a critical length exists which represents the maximum horizontal distance that can be bridged across with an empty space or no support devices positioned beneath. For example, two vertical walls spaced apart 10 mm might easily be bridged to enclose the space between the walls and the bridging surface. However, 20 mm may be too far to bridge as the added material will tend to sag or droop into the space as the top surface is added. Thus, the critical length is the maximum length that can be bridged for a particular process, material, and application. Typically, this critical length falls between 10 mm and 25 mm.

Figure 6:
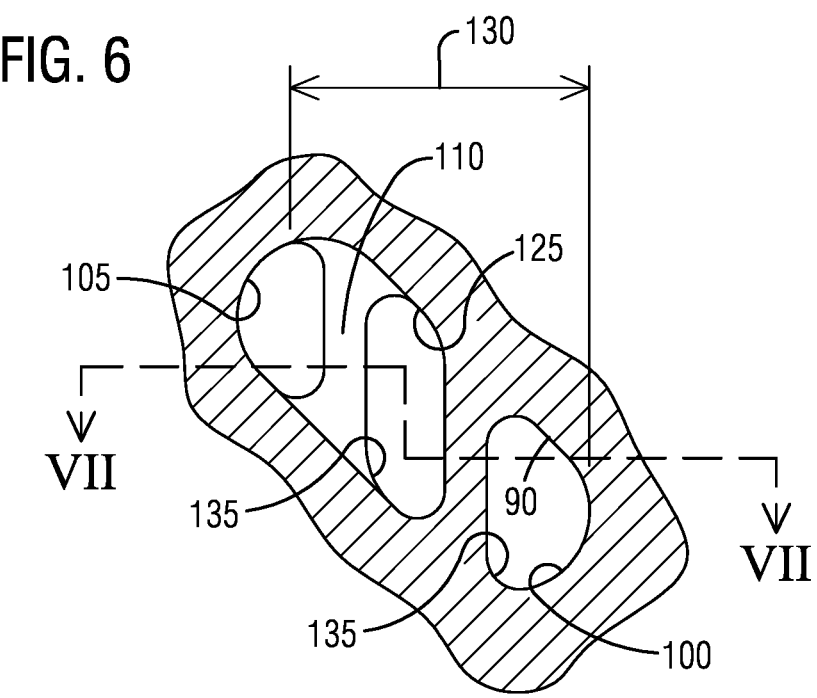
FIG. 6 is an enlarged section view of a fuel channel of FIG. 3 in the manufacturing position illustrating several support members.

The arrangement of the support housing 15, when positioned with the central axis 95 oriented vertically includes a top surface 125 for each of the flow spaces 75, 80 that have a length 130 greater than the critical length. Using the positioner 125 to rotate the central axis 95 to about 45 degrees effectively reduces the length 130 by about thirty percent. However, as illustrated in FIG. 6, the formation of support members 110 significantly reduces the effective length and facilitates high-quality bridging from the outer wall 100 to the support member 110 and from the support member 110 to the inner wall 105. Because the support members 110 are formed along a vertical axis when the support member 15 is tipped, the support members 110 end with long axes that extend at the oblique angle 115 with respect to the mounting surface 65.

As illustrated in FIG. 4, the support members 110 are formed with large fillet portions 135 at the ends to reduce any potential stress risers at the intersections of the oval wall 90 and the support member 110.

Figure 7:
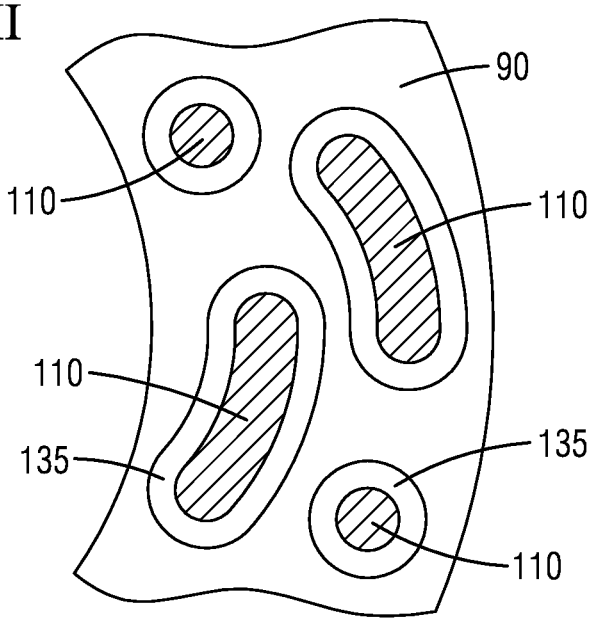
FIG. 7 is a section view of the fuel channel taken along line 4-4 of FIG. 5.

As illustrated in FIG. 7, each of the support members 110 includes a substantially circular cross section when sectioned normal to the long axis of the support member 110. In addition, the support members 110 can be positioned in two rows that extend around the centerline 95 as illustrated in FIG. 6 or in fewer or more rows as may be required by the size of the flow space 75, 80. As can be seen in FIG. 7, the support members 110 are staggered with respect to one another (i.e., located at different circumferential positions with respect to the centerline 95). Of course many different arrangements of the support members 110 are possible.

In addition, other constructions may include elongated support members. Elongated members would have a section view that might resemble a curved oval shape or a simple oval or ellipse. The only limitation to the support members 110 is that they should allow a free flow of fuel around the annular flow spaces 75, 80.

As discussed with regard to FIGS. 3-5, one method of constructing the support housing 15 includes forming the boss portion 50 using an additive manufacturing process onto a conventionally manufactured base portion 45. As illustrated in FIGS. 3-5, the boss portion 50 is formed layer-by-layer without rotating the support housing 15 during manufacture. In another construction, the boss portion 50 is formed while rotating the support housing 15 about the centerline 95. This effectively results in building the boss portion 50 layer-by-layer but also builds the support housing 15 from the outer diameter toward the inner diameter. In still other constructions, the base portion 45 is also formed using additive manufacturing techniques.

The terms "substantially" and "about" are meant to cover typical manufacturing and design tolerances for the specific feature they are used to describe. Thus, a manufacturing tolerance for two members being parallel might be ten degrees. In that example, "about" or "substantially" means parallel plus or minus ten degrees.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A support housing for use in distributing fuel in a gas turbine engine, the support housing comprising:
   a main body defining an inlet aperture, a plurality of outlet apertures, and a substantially planar mounting surface;
   a first fuel channel having a wall that defines a first flow space; and
   a support member extending across the first flow space and having a long axis, the long axis of the support member being oriented at an oblique angle with respect to the mounting surface,
   wherein the wall of the first fuel channel is oval and defines a long axis, the long axis of the wall for the first fuel channel is substantially parallel to the mounting surface, and the wall encloses the first flow space to prevent air from entering the first flow space.

2. The support housing of claim 1, wherein the main body includes a first end and a second end opposite the first end, and wherein the inlet aperture is formed in the first end and the outlet apertures are formed in the second end.

3. The support housing of claim 1, wherein the first fuel channel is annular.

4. The support housing of claim 1, further comprising a plurality of support members each disposed within the first flow space.

5. The support housing of claim 1, further comprising a second fuel channel spaced apart from the first fuel channel.

6. The support housing of claim 5, further comprising a plurality of second support members each disposed within a second flow space.

7. A support housing for use in distributing fuel in a gas turbine engine, the support housing comprising:
   a base portion defining an inlet aperture and a substantially planar mounting surface;
   a boss portion extending from the base portion and defining a plurality of outlet apertures;
   a first fuel channel having a first wall that defines a first flow space;
   a second fuel channel having a second wall that defines a second flow space, the first flow space and the second flow space being annular spaces that are spaced apart from one another;
   a first plurality of support members extending across the first flow space and having a long axis, the long axis of the first plurality of support members are oriented at an oblique angle with respect to the mounting surface; and
   a second plurality of support members extending across the second flow space and having a long axis, the long axis of the second plurality of support members are oriented at an oblique angle with respect to the mounting surface,
   wherein the first wall is oval and defines a long axis, the long axis of the first wall is parallel to the planar mounting surface, and the first wall encloses the first flow space to prevent air from entering the first flow space.

8. The support housing of claim 7, wherein each of the first plurality of support members and the second plurality of support members are parallel to one another.

9. The support housing of claim 7, wherein the first wall includes a first end wall and a second end wall and wherein the first end wall and the second end wall are separated by a distance greater than a critical distance.

10. The support housing of claim 7, wherein each of the first plurality of support members is substantially circular in cross section.

11. The support housing of claim 7, wherein only the first flow space provides fuel to the gas turbine engine during starting.

12. The support housing of claim 7, wherein both the first flow space and the second flow space deliver fuel to the gas turbine engine during operation.

* * * * *